UNITED STATES PATENT OFFICE.

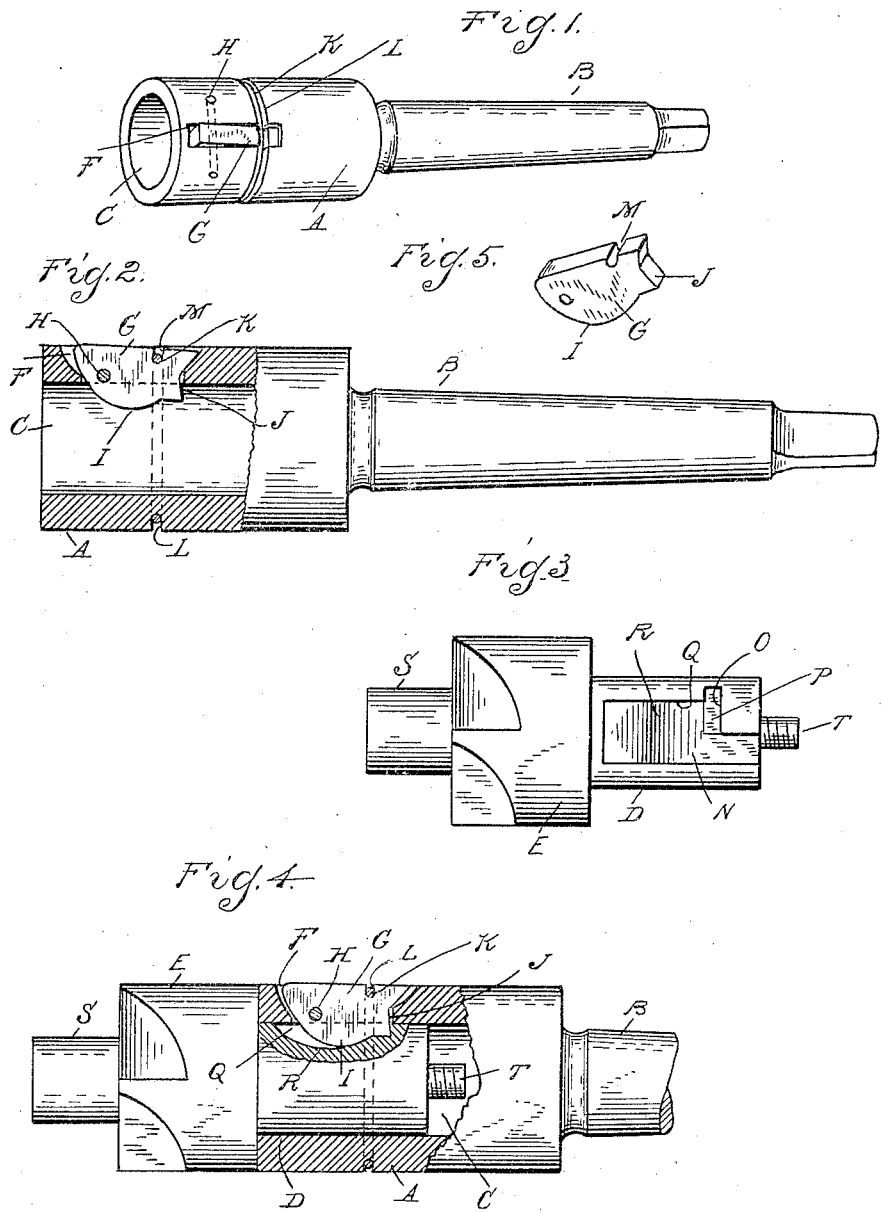

FRANK E. SHAILOR, OF DETROIT, MICHIGAN, ASSIGNOR TO GEORGE A. GLOOR, OF DETROIT, MICHIGAN.

CHUCK OR HOLDER.

1,374,399.  Specification of Letters Patent.  Patented Apr. 12, 1921.

Application filed October 9, 1918. Serial No. 257,511.

*To all whom it may concern:*

Be it known that I, FRANK E. SHAILOR, a citizen of the United States of America, residing at Detroit, in the county of Wayne and State of Michigan, have invented certain new and useful Improvements in Chucks or Holders, of which the following is a specification, reference being had therein to the accompanying drawings.

The invention relates to chucks designed for the holding of boring tools and more particularly for use in holding counterboring tools. The invention consists in the novel construction as hereinafter set forth.

In the drawings:

Figure 1 is a perspective view of the chuck;

Fig. 2 is a longitudinal section therethrough with the counterboring tool removed;

Fig. 3 is an elevation of the counterboring tool;

Fig. 4 is a view similar to Fig. 2 with the counterboring tool in engagement;

Fig. 5 is a perspective view of the drawing dog.

A is the body of the chuck which is provided with a tapering shank B or other means for mounting upon the drill spindle. The member A is provided at its outer end with a cylindrical recess C adapted to receive the shank D of a counterboring tool E. F is a slot in one side of the member A which may be formed by milling, and G is a dog located within the slot F and pivotally secured at one end by the cross pin H. The dog G has a segmental portion I projecting within the cylindrical recess C and terminating at its inner end in a substantially square shoulder J. K is a spring loop which may be snapped into engagement with a groove L surrounding the member A and adjacent to the free end of the dog G which has a notch M for receiving said spring. The arrangement is such that the spring will normally hold the dog in position to project inward into the recess C but will yield to permit outward movement of the dog. The shank D of the cutter E is formed with a longitudinal slot N therein, the inner portion of said slot being of greater width than the end portion so as to form on the latter a shoulder O. This slot may be conveniently formed by milling and the shoulder O may be squared by cross milling, as indicated at P. Furthermore, the shoulder O is so located that when the shank D is inserted in the recess C said shoulder will be in transverse alinement with the shoulder J on the dog G. Thus by entering the dog G through the longitudinal slot N and by then rotating the shank the shoulder J will engage with the shoulder O, thereby holding the tool from longitudinal movement.

With the construction as thus far described, when the shank D is inserted in the recess C the dog G will enter the slot N. By then rotating the shank the side face of the dog G will come into engagement with the side face Q of the slot, forming a rotary driving engagement for the cutter in the direction in which it performs its work. While thus engaged it is impossible to withdraw the tool longitudinally as the shoulder J bears against the shoulder O. However, the tool may be readily released when disengaged from the work by slightly revolving it in reverse direction to disengage the shoulders J and O and then withdrawing the shank longitudinally.

To prevent the accidental dropping off of the cutter there is frictional resistance to the withdrawal of the shank even when the dog G is in registration with the entering slot N. This engagement is formed by milling the slot N of slightly greater depth in its inner portion, as indicated at R, than the depth of the entering portion. Thus in entering the shank the dog G will be pressed slightly outward against the yielding resistance of the spring L and after passing to the tapered portion of the slot the dog will be pressed inward again. Thus to withdraw the shank the tension of the spring L must be overcome.

The cutter E may be provided with a suitable pilot, such as S, which has a shank T passing through an axial bore in the cutter. This shank is threaded and engages the correspondingly threaded portion of the bore, thereby holding the pilot from dropping out.

What I claim as my invention is:—

1. The combination with a rotary holder having an axial recess, of a dog projecting into said recess and providing a shoulder at its inner end, and a tool having a shank for fitting said recess provided with a longitudinal slot for the passage of said dog, said slot having a lateral offset forming a shoulder for engaging the shoulder on said dog and means yieldably urging the dog into said recess.

2. The combination with a rotary holder having an axial recess, of a dog engaging a slot in said holder and projecting into said recess, and a tool having a shank for fitting said recess longitudinally slotted for the passage of said dog and having a lateral offset in said slot forming a shoulder for engaging said dog and means yieldably urging the dog into said recess.

3. The combination with a rotary holder having an axial recess, of a dog pivotally engaging a slot in said holder and projecting into said recess, resilient means for yieldably pressing said dog inward, and a tool having a shank fitting said recess provided with a longitudinal slot for the passage of said dog, the entrance portion of said slot being of lesser depth and forcing said dog outward against the tension of said resilient means, said slot being also provided with a laterally offset portion for receiving said dog providing a shoulder for engaging a coöperating shoulder at the inner end of said dog to retain the tool from displacement.

4. The combination with a rotary holder having an axial recess and a longitudinal slot in one side intersecting said recess, of a dog engaging said slot and pivotally secured at its outer end, a spring engaging an annular groove in said holder crossing and bearing against the inner end of said dog, and a tool having a shank fitting said recess longitudinally slotted for the passage of said dog and having a laterally offset portion forming a shoulder for engaging the inner end of the dog to retain said tool from displacement.

5. The combination with a rotary holder having an axial recess and a longitudinal slot in one side intersecting said recess, of a dog engaging said slot and projecting into said recess, a pivot mounting for said dog at its outer end, a spring engaging an annular recess in said holder crossing and bearing against the inner end of said dog, and a tool having a shank for fitting said recess, said shank being milled to form a longitudinal slot for the passage of said dog with a laterally offset portion in said slot and a cross milled portion forming a shoulder for engaging the inner end of said dog.

6. The combination with a rotary holder having an axial recess and a longitudinal slot in one side intersecting said recess, of a dog pivotally mounted in said slot, means yieldably urging the free end of said dog inwardly, and a tool having a shank fitting said recess, longitudinally slotted for the passage of said dog, and having a laterally offset portion having a shoulder for engaging the inner end of the dog to retain said dog from displacement.

7. The combination with a rotary holder having an axial recess and a longitudinal slot in one side intersecting said recess, of a dog pivotally mounted in said slot, means yieldably urging the free end of said dog inwardly, and a tool having a shank fitting said recess, said shank being milled to form a longitudinal slot for the passage of said dog with a laterally offset portion in said slot and a cross milled portion forming a shoulder for engaging the inner end of said dog.

8. The combination with a rotary holder having an axial recess and a longitudinal slot in one side intersecting said recess, of a dog pivotally mounted in said slot and provided with a shoulder engageable with a margin of said slot to limit movement of the dog into said recess, and a tool having a shank fitting said recess longitudinally slotted for the passage of said dog and having a laterally offset portion forming a shoulder for engaging the inner end of the dog to retain said dog from displacement.

In testimony whereof I affix my signature.

FRANK E. SHAILOR.